United States Patent
Naik et al.

(10) Patent No.: US 10,344,194 B2
(45) Date of Patent: Jul. 9, 2019

(54) THERMAL INTERFACE COMPOSITION COMPRISING IONICALLY MODIFIED SILOXANE

(71) Applicant: Momentive Performance Materials Inc., Waterford, NY (US)

(72) Inventors: Sandeep Naik, Bangalore (IN); Pranabesh Dutta, Bangalore (IN); Vinu Krishnan Appukuttan, Bangalore (IN); Anubhav Saxena, Bangalore (IN); Masanori Takanashi, Gunma Prefecture (JP)

(73) Assignee: Momentive Performance Materials Inc., Waterford, NY (US)

( * ) Notice: Subject to any disclaimer, the term of this patent is extended or adjusted under 35 U.S.C. 154(b) by 65 days.

(21) Appl. No.: 15/716,810

(22) Filed: Sep. 27, 2017

(65) Prior Publication Data
US 2019/0092993 A1    Mar. 28, 2019

(51) Int. Cl.
| | | |
|---|---|---|
| *C08K 3/22* | (2006.01) | |
| *C08K 3/38* | (2006.01) | |
| *C09K 5/10* | (2006.01) | |
| *B33Y 10/00* | (2015.01) | |
| *C09D 183/08* | (2006.01) | |
| *C09J 183/08* | (2006.01) | |

(52) U.S. Cl.
CPC .............. *C09K 5/10* (2013.01); *B33Y 10/00* (2014.12); *C08K 3/22* (2013.01); *C08K 3/38* (2013.01); *C09D 183/08* (2013.01); *C09J 183/08* (2013.01); *C08K 2003/2227* (2013.01); *C08K 2003/385* (2013.01)

(58) Field of Classification Search
CPC .............................. C09J 183/08; C09D 183/08
See application file for complete search history.

(56) References Cited

U.S. PATENT DOCUMENTS

| | | |
|---|---|---|
| 6,306,957 B1 | 10/2001 | Nakano |
| 6,380,301 B1 | 4/2002 | Enami |
| 6,844,393 B2 | 1/2005 | Goto |
| 7,291,671 B2 | 11/2007 | Fukui |
| 7,547,743 B2 | 6/2009 | Goto |
| 7,622,539 B2 | 11/2009 | Fukui |
| 7,692,032 B2 | 4/2010 | Hoshino |
| 8,093,331 B2 | 1/2012 | Fukui |
| 8,119,758 B2 | 2/2012 | Sakurai |
| 8,383,005 B2 | 2/2013 | Tsuji |
| 8,618,211 B2 | 12/2013 | Bhagwagar |
| 2013/0172419 A1* | 7/2013 | Saxena ................. C08G 77/38 514/570 |

FOREIGN PATENT DOCUMENTS

| | | |
|---|---|---|
| EP | 1803798 | 7/2007 |
| EP | 2312593 | 4/2011 |
| JP | 2005325212 | 11/2005 |
| JP | 2015209466 | 11/2015 |
| WO | 2015022998 | 2/2015 |

OTHER PUBLICATIONS

Patent Cooperation Treaty (PCT), International Search Report and Written Opinion for Application PCT/US2018/052362 filed Sep. 24, 2018, dated Dec. 13, 2018, International Searching Authority, EP.

* cited by examiner

*Primary Examiner* — Jeffrey C Mullis
(74) *Attorney, Agent, or Firm* — Joseph Waters; McDonald Hopkins LLC

(57) ABSTRACT

A thermally conductive silicone composition is shown and described herein. The thermally conductive silicone composition comprises (A) an ionically modified siloxane, and (B) a thermally conductive filler comprising a first filler and a second filler, where the first filler and/or the second filler comprises a plurality of filler types, the plurality of filler types differing from one another in terms of particle size and/or morphology. The ionically modified siloxane may function as a dispersing aid or wetter for efficient dispersion of thermal conducting organic and inorganic fillers to achieve high thermal conductivity.

36 Claims, No Drawings

THERMAL INTERFACE COMPOSITION COMPRISING IONICALLY MODIFIED SILOXANE

FIELD OF INVENTION

The present invention relates to a thermal interface adhesive or grease containing an ionically modified siloxane as a dispersing aid or wetter for efficient dispersion of thermal conducting organic and inorganic fillers such as boron nitride to achieve high thermal conductivity. The wetter shows excellent compatibility with the fillers, which leads to low bleed out and dry out grease formulation. With no antagonistic effect on addition or condensation curing, these ionically modified siloxanes provide improvement in elasticity/elongation and hardness of the cured formulation.

BACKGROUND

Thermal interface material formulations generally consist of high thermal conducting fillers with inherent thermal conductivity. These fillers, when incorporated into a matrix over its percolation volume, lead to exponential increment in bulk thermal conductivity. The bulk thermal conductivity of a thermal interface material depends heavily on the volume percent loading of the fillers. As the amount of fillers increases, the interaction between filler and base resin increases. This leads to a dramatic jump in the viscosity of the formulation which causes difficulty in processing and dispensing the formulation. Dispersion aids or wetters are the class of material that reduce these interactions and help in efficient dispersion of fillers without significant viscosity build up.

U.S. Pat. No. 8,017,684 describes an alkoxy silane as a wetter wherein the alkoxy groups interact with the filler surface. Alkoxy silane may work as a wetter, but volatilizes from the formulation under the operating temperature due to its low molecular weight and viscosity. This leads to dry-out of the formulation. JP2005325212 and U.S. Pat. Nos. 6,306,957; 6,380,301; 7,291,671; 8,093,331; 8,119,758; and 8,383,005 discuss the use of hydrolysable methyl polysiloxanes as a dispersing aid. Compared to alkoxy silane, however, alkoxy functionalized polyorganosiloxanes have very poor wettability and must be added at high loadings. U.S. Pat. No. 7,622,539 describes acrylate functionalized alkoxy organopolysiloxanes, wherein the wetter molecule, after reacting with filler surface, can be cross-linked within the matrix to avoid volatilization of bleed out. This may affect cross-link density and eventually the elasticity of the cured matrix. U.S. Pat. Nos. 7,547,743 and 6,844,393 describe the use of vinyl functionalized alkoxy polysiloxanes for the same application. U.S. Pat. No. 7,692,032 describes both curable and non-curable compound of alkoxy functionalized cyclosiloxanes for thermal grease and rubber applications. Apart from this, JP2015209466 describes the application of β-ketoester functionalized polyorgano-metalosiloxanes wherein the metal-ligand interacts with the filler surface. U.S. Pat. No. 8,618,211 mentions a reference to the use of anionic, cationic, or non-ionic organic surfactants such as Tergitol and Triton-X as a wetter, but these will phase out of the formulation eventually.

Boron nitride is sought after to use as a filler because of its high thermal conductivity and low electrical conductivity. Additionally, it is a soft, lubricaious and low density filler, which is advantageous in dispensing and to provide a soft formulation. But unlike many fillers, it lacks any surface functionality, which makes it difficult to effectively disperse boron nitride in a thermal formulation. Traditional wetters with alkoxy functionalization are not sufficient to use boron nitride as it lacks surface interlinking with boron nitride surface. Efforts to surface modify boron nitride have yielded limited results with low success.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The present invention provides a composition with a polysiloxane wetter and a filler such as boron nitride. In particular it has been found that an effective thermal interface composition may be provided by the combination of a filler, such as boron nitride, with polysiloxanes that are chemically modified with ionic groups. Further, it has been found that adjusting the molecular weight of the wetter to control the viscosity may provide a workable formulation and at the same time prevent any loss due to volatilization, which reduces dry-out during operating cycles. The siloxanes can be modified with a curable functional group to make the wetter cross-linkable with the matrix to eliminate the bloom-out effect. The ionically modified siloxane during the synthesis contains 5-20% silanol capped which helps in wetting other fillers such as alumina oxide, alumina nitride, metallic oxides, and silicone carbide. Further, it has been found that the combination of boron nitride with different fillers can be effective in obtaining a desirable balance between viscosity and thermal conductivity.

The combination of the ionically modified polysiloxane and thermally conductive filler provides a high thermal conducting formulation with improvement in hardness and elongation of the formulation compared to alkoxy based wetters for similar loading of fillers. In addition, these modified siloxanes lead to shear thinning formulation, which aids positively towards dispersion and application.

In one aspect, provided is a composition comprising:
(A) an ionically functionalized siloxane (I) represented by a compound of the formula:

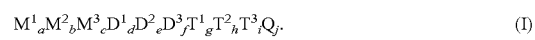

wherein:
$M^1 = R^1 R^2 R^3 SiO_{1/2}$
$M^2 = R^4 R^5 R^6 SiO_{1/2}$
$M^3 = R^7 R^8 R^9 SiO_{1/2}$
$D^1 = R^{10} R^{11} SiO_{2/2}$
$D^2 = R^{12} R^{13} SiO_{2/2}$
$D^3 = R^{14} R^{15} SiO_{2/2}$
$T^1 = R^{16} SiO_{3/2}$
$T^2 = R^{17} SiO_{3/2}$
$T^3 = R^{18} SiO_{3/2}$
$Q = SiO_{4/2}$
$R^1$, $R^2$, $R^3$, $R^5$, $R^6$, $R^8$, $R^9$, $R^{10}$, $R^{11}$, $R^{13}$, $R^{15}$, $R^{16}$ are substituted or unsubstituted aliphatic, alicyclic, or aromatic containing hydrocarbon having from 1 to 60 carbon atoms, optionally containing heteroatom(s);
$R^4$, $R^{12}$, and $R^{17}$ are independently chosen from (i) a monovalent radical-bearing ion-pairs having the formula (II), or (ii) a zwitterion having formula (III), wherein formula (II) is as follows:

where A is a spacing group having at least one spacing atom selected from a divalent hydrocarbon or hydrocarbonoxy group; I is an ionic group selected from sulfonate (—SO$_3^-$), sulfate (—OSO$_3^-$), carboxylate (—COO$^-$), phosphonate (—PO$_3^{2-}$), and phosphate (—OPO$_3^{2-}$) groups; M is chosen from hydrogen or a cation independently selected from alkali metals, alkaline earth metals, transition metals, rare earth metals, metals, metal complexes, quaternary ammonium, and phosphonium groups, hydrocarbon cations, alkyl cations, organic cations, and cationic polymers; formula (III) is as follows:

$$R'-NT_a^+-R''-I^- \quad (III)$$

where R' is a divalent hydrocarbon radical containing from 1 to about 60 carbon atoms, R'' is a divalent hydrocarbon radical containing from 2 to about 60 carbon atoms, specifically from 2 to about 8 carbon atoms and more specifically from 2 to about 4 carbon atoms; and, I is an ionic group selected from sulfonate —SO$_3^-$, sulfate —OSO$_3^-$, carboxylate —COO$^-$, phosphonate —PO$_3^{2-}$ and phosphate —OPO$_3^{2-}$ groups; T is independently selected from hydrogen, an aliphatic group having 1 to 60 carbon atoms, an alicyclic group having 6 to 60 carbon atoms, or an aromatic group having 6 to 60 carbon atoms; a is 1 or 2;

n and y are independently from 1 to 6 and x is a product of n and y

R$^7$, R$^{14}$, and R$^{18}$ are independently selected from hydrogen, OR$^{20}$, or an unsaturated monovalent hydrocarbon optionally containing heteroatom(s) or a heteroatom such as oxygen, nitrogen, sulfur or containing organosilane groups; where R$^{20}$ is selected from hydrogen, substituted or unsubstituted aliphatic, alicyclic, or aromatic containing hydrocarbon having from 1 to 60 carbon atoms and the subscript a, b, c, d, e, f, g, h, i, j are zero or positive subject to the following limitations: 2≤a+b+c+d+e+f+g+h+i+j≤1000, b+e+h>0 and c+f+i≥0; and (B) (i) a first filler, and (ii) a second filler, where at least one of the first filler and/or the second filler comprises a plurality of filler types differing from one another in terms of particle size and/or morphology.

In one embodiment, (i) the first filler is provided by:
a first filler type having a first particle size, and a second filler type having a second particle size, where the first and second filler types have the same morphology;
a first filler type having a first morphology, and a second filler type having a second morphology, where the first and second filler types have the same particle size; or
a first filler type having a first morphology, and a second filler type having a second morphology, where the first and second filler types have different particle sizes; and (ii) the second filler is provided by:
a second filler type having a first particle size, and a second filler type having a second particle size, where the first and second filler types have the same morphology;
a second filler type having a first morphology, and a second filler type having a second morphology, where the first and second filler types have the same particle size; or
a second filler type having a first morphology, and a second filler type having a second morphology, where the first and second filler types have different particle sizes.

In one embodiment of a composition according to any previous embodiment, the first and second filler are independently chosen from a metal oxide filler and a non-oxide filler.

In one embodiment of a composition according to any previous embodiment, the non-oxide filler is chosen from a metal boride, a metal carbide, a metal nitride, a metal silicide, carbon black, graphite, graphene, expanded graphite, carbon fiber, or graphite fiber or a combination of two or more thereof.

In one embodiment, the first filler is a metal oxide comprising a first type of metal oxide and a second type of metal oxide, which may be the same or different metal oxide in terms of chemical make up, and the second filler comprises a single type of non-oxide filler, where any of the following (alone or in combination) may be employed:
the first type of metal oxide has a first particle size, and the second type of metal oxide has a second particle size different from the first particle size;
the first and second type of metal oxide independently have a particle size of from about 0.3 to about 350 microns, where the first and second type of metal oxide have a different particle size;
the first type of metal oxide has a first morphology, and the second type of metal oxide has a second morphology different from the first morphology;
the metal oxide filler is chosen from alumina, magnesia, ceria, hafnia, lanthanum oxide, neodymium oxide, samaria, praseodymium oxide, thoria, urania, yttria, zinc oxide, and/or zirconia;
the non-metal oxide filler is chosen from silicon carbide, silica, boron carbide, titanium carbide, zirconium carbide, boron nitride, silicon nitride, aluminum nitride, titanium nitride, zirconium nitride, or zirconium boride;
the first filler is alumina, and the second filler is boron nitride;
the second filler is a boron nitride chosen from spherical, platelet, agglomerates, or spherical agglomerates.

In one embodiment, the composition according to any previous embodiment comprises a first filler chosen from a metal oxide, and a second filler chosen from a non-oxide filler where the first filler and the second filler each comprises a plurality of filler types. In one embodiment, the first filler is a metal oxide comprising a first type of metal oxide and a second type of metal oxide, where the first and second type of metal oxide may have the same or different chemical composition or formula (but differ at least in respect of particle size and/or morphology), and the second filler comprises a single type of non-oxide filler, where any of the following may be employed in combination with one another:
the first type of metal oxide has a first particle size, and the second type of metal oxide has a second particle size different from the first particle size;
the first and second type of metal oxide independently have a particle size of from about 0.3 to about 350 microns, where the first and second type of metal oxide have a different particle size;
the first type of metal oxide has a particle size of about 0.4 micron to about 3 microns; the second type of metal oxide has a particle size of 3 to about 12 microns;
the first type of metal oxide has a particle size of about 0.1 micron to about 1 microns; the second type of metal oxide has a particle size of 10 to about 15 microns the first type of metal oxide has a first morphology, and the second type of metal oxide has a second morphology different from the first morphology;

the first type of metal oxide has a first particle size, and the second type of metal oxide has a second particle size different from the first particle size;

the metal oxide filler is chosen from alumina, magnesia, ceria, hafnia, lanthanum oxide, neodymium oxide, samaria, praseodymium oxide, thoria, urania, yttria, zinc oxide, and/or zirconia;

the non-metal oxide filler is chosen from silicon carbide, silica, boron carbide, titanium carbide, zirconium carbide, boron nitride, silicon nitride, aluminum nitride, titanium nitride, zirconium nitride, or zirconium boride;

the non-metal oxide filler has a particle size of about 30 to about 500 microns;

the first filler is alumina, and the second filler is boron nitride;

the second filler comprises platelet boron nitride and boron nitride agglomerates;

the second filler comprises platelet boron nitride and spherical boron nitride;

the second filler comprises platelet boron nitride having a particle size of from about 30 to about 50 microns and boron nitride agglomerates of from about 110 to about 150 microns;

the second filler comprises platelet boron nitride having a particle size of from about 30 to about 50 microns and boron nitride agglomerates of from about 300 to about 370 microns;

the second filler comprises platelet boron nitride having a particle size of from about 5 to about 50 microns and spherical boron nitride particles having a particle size of from about 1 to about 10 microns;

the second filler comprises platelet boron nitride having a particle size of from about 5 to about 50 microns; spherical boron nitride particles having a particle size of from about 1 to about 10 microns; and spherical boron nitride particles having a particle size of from about 50 to about 70 microns.

In one embodiment, provided is a composition of any previous embodiment, wherein the first and second fillers are independently chosen from alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, graphene, aluminum powder, copper powder, bronze powder, brass powder, fibers or whiskers of carbon, graphite, silicon carbide, silicon nitride, alumina, aluminum nitride, zinc oxide, carbon nanotubes, boron nitride nanosheets, zinc oxide nanotubes, or a combination of two or more thereof.

In one embodiment, provided is a composition of any previous embodiment, wherein the plurality of filler types independently have an average particle size of from about 0.3 micron to about 350 micron, the plurality of filler types having average particle sizes different from one another.

In one embodiment, provided is a composition of any previous embodiment, wherein the plurality of filler types have a morphology different from one another, the morphology being chosen from spherical, platelet, agglomerates, spherical agglomerates and graphitic.

In one embodiment, provided is a composition of any previous embodiment, wherein the first filler is chosen from aluminum oxide, and the second filler is chosen from boron nitride. In one embodiment, the aluminum oxide comprises a plurality of filler types. In one embodiment, the plurality of filler types have an average particle size different from one another. In one embodiment, the plurality of filler types have a morphology different from one another. In one embodiment, the aluminum oxide and the boron nitride each comprise the plurality of filler type.

In one embodiment, provided is a composition of any previous embodiment, wherein the first filler is chosen from a metal oxide, and the second filler is chosen from a non-oxide filler. In one embodiment, the plurality of filler types of the first filler have an average particle size different from one another, and the plurality of filler types of the second filler have an average particle size different from one another. In one embodiment, the plurality of filler types of the first filler have an average particle size different from one another, and the plurality of filler types of the second filler have a morphology different from one another. In one embodiment, plurality of filler types of the second filler is chosen from platelet boron nitride and agglomerates of boron nitride.

In one embodiment, provided is a composition of any previous embodiment comprising about 10 vol. % to about 90 vol. % of the first filler and about 90 vol. % to about 10 vol. % of the second filler.

In one embodiment, provided is a composition of any previous embodiment, wherein the fillers are treated with a surface functionalizing agent chosen from an alkoxy silane, an alkacryloxy silane, a vinyl silane, a halo silane (e.g., a chlorosilane), a mercapto silane, a blocked mercaptosilane, a thiocarboxylate silane, titanate salts, zirconate salts or a combination of two or more thereof.

In one embodiment, provided is a composition of any previous embodiment, wherein the divalent hydrocarbon group A is chosen from an alkylene group, an arylene group, an aralkylene group, alicyclic group or an hydrocarbonoxy group. In one embodiment, the divalent hydrocarbon group of A in formula (II) is chosen from (i) an alkylene group of the formula —$(CHR^{45})_q$— where q has a value of 2 to 20, and $R^{45}$ is hydrogen or a divalent hydrocarbon of 1 to 20 carbon atoms; (ii) an arylene group selected from the group consisting of —$(CH_2)_1C_6H_4(CH_2)_k$—, —$CH_2CH(CH_3)(CH_2)_kC_6H_4$—, —$(CH_2)_kC_5H_4$— where 1 has a value of 1 to 20, and k has a value of 0 to 10.

In one embodiment, provided is a composition of any previous embodiment, wherein M is a cation independently selected from Li, Na, K, Cs, Mg, Ca, Ba, Zn, Cu, Fe, Ni, Ga, Al, Mn, Cr, Ag, Au, Pt, Pd, Ru, and Rh.

In one embodiment, provided is a composition of any previous embodiment, wherein $R^7$, $R^{14}$, and $R^{18}$ are independently selected from a group of the formulae (IV) to (VII).

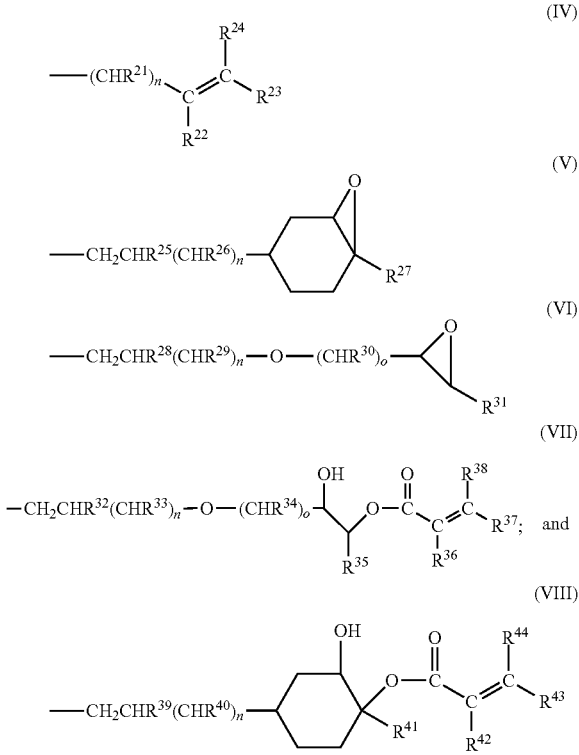

where $R^{21}$, $R^{26}$, $R^{29}$, $R^{30}$, $R^{33}$, $R^{34}$, $R^{40}$ are independently selected from —H, —OH, alkyl, alkenyl, cycloalkyl, aryl, and aliphatic/aromatic monovalent hydrocarbon having from 1 to 60 carbon atoms; the subscript n is zero or positive integer and has a value in the range of 0 to 6, the subscript o is positive integer and has a value in the range of 1 to 6; and $R^{20}$, $R^{22}$, $R^{23}$, $R^{24}$, $R^{25}$, $R^{27}$, $R^{28}$, $R^{31}$, $R^{32}$, $R^{35}$, $R^{36}$, $R^{37}$, $R^{38}$, $R^{39}$, $R^{41}$, $R^{42}$, $R^{43}$, $R^{44}$, are independently selected from aliphatic/aromatic monovalent hydrocarbon having from 1 to 60 carbon atoms.

In one embodiment, provided is a composition of any previous embodiment, wherein the ionically modified siloxane (A) has a weight-average molecular weight (Mw) of from about 6000 to about 35000 g/mol.

In one embodiment, provided is a composition of any previous embodiment, wherein the ionically modified siloxane (A) has a viscosity of from about 0.01 Pa·s to about 45 Pa·s.

In one embodiment, provided is a composition of any previous embodiment, wherein the ionically modified siloxane (A) has 0.2 to 1 ionic character per 100 siloxane (Si—O) unit.

In one embodiment, provided is a composition of any previous embodiment comprising (i) an organopolysiloxane comprising at least one alkenyl functional group; and/or (ii) an organopolysiloxane comprising at least one Si—H group.

In one embodiment, provided is a composition of any previous embodiment comprising an addition catalyst, a condensation curing catalyst, an inhibitor, an adhesion promoter, a diluent, a thermal stabilizer, or a combination of two or more thereof.

In one embodiment, provided is a composition of any previous embodiment, wherein the thermal conductivity of the formulation is between 2 W/mk to 14 w/mk.

In one embodiment, provided is a composition of any previous embodiment, wherein the composition has a Shore E hardness of from about 10 to about 90.

In one embodiment, provided is a composition of any previous embodiment having an elongation of from about 10% to about 60%.

In one embodiment, provided is a composition of any previous embodiment in the form of a grease, a potting, a gap filler, a sealant, an adhesive, or a gel.

In one aspect, provided is an article comprising the composition according to any of the previous embodiments disposed on at least a portion of a surface of the article. In one embodiment, the article comprises multiple layers, and the composition is disposed on a surface in between at least two of the layers. In one embodiment, the article is an electronic article, an automotive article, a home appliance article, smart appliance article, a telecommunication article, a healthcare article, a personal care article, an agricultural article, a molded article, a masonry surface, a textile material, a home care material. In one embodiment, the article comprises light emitting devices, computer devices, a stacked die, mobile phones, tablets, flip chip package, hybrid memory cube, touch screens, Wi-Fi device, automotive technology hifi systems, a through-silicon via device, and audio systems, in joints between heat pipes and water tanks in solar heated heating, in fuel cells and wind turbines, in the manufacture of computer chips, gaming consoles, data transfer devices, in light devices, batteries, in housings, coolers, heat exchanging devices, wires, cables, heating wires, refrigerators, dishwashers, air conditionings, accumulators, transformers, lasers, functional clothing, car seats, medical devices, fire protection, electric motors, planes, and trains, as a filament for 3D printing material, drug delivery systems, transdermal patches, wound healing patches, wound dressing patches, patches for scar reduction, transdermal iontophoresis, scaffold for tissue engineering, anti-microbial devices, wound management devices, ophthalmic devices, bioinserts, prostheses, body implants, paint, structural coating, masonry coating, or marine coating, seed coating, superspreader or controlled release fertilizer.

In one aspect, provided is a method of preparing the article of any previous embodiment, In one embodiment, the method comprises providing first and second substrates and disposing the composition according to any previous embodiments between the first and second substrates. In one embodiment, the method of preparing the article comprises dispensing the composition under pressure or stencil printing or screen printing or jet printing or 3D printing. In one embodiment, the thickness of the said composition is from 0.01 mm to 15 cm.

The following description and the drawings disclose various illustrative aspects. Some improvements and novel aspects may be expressly identified, while others may be apparent from the description and drawings.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The expression "hydrocarbon radicals" means any hydrocarbon group from which one or more hydrogen atoms have been removed and is inclusive of alkyl, alkenyl, alkynyl, cyclic alkyl, cyclic alkenyl, cyclic alkynyl, aryl, aralkyl and arenyl, and optionally it is substituted with oxygen, nitrogen, or sulfur.

The term "alkyl" means any monovalent, saturated, straight, branched, or cyclic hydrocarbon group. The term "alkenyl" means any monovalent straight, branched, or cyclic hydrocarbon group containing one or more carbon-carbon double bonds where the site of attachment of the group can be either at a carbon-carbon double bond or elsewhere therein. The term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include, but are not limited to, methyl, ethyl, propyl, and isobutyl. Examples of alkenyls include, but are not limited to vinyl, propenyl, allyl, methallyl, ethylidenyl norbornane, ethylidene norbornyl, ethylidenyl norbornene and ethylidene norbornenyl. Examples of alkynyls include acetylenyl, propargyl, and methylacetylenyl.

The expressions "cyclic alkyl," "cyclic alkenyl," and "cyclic alkynyl" include bicyclic, tricyclic, and higher cyclic structures as well as the aforementioned cyclic structures further substituted with alkyl, alkenyl, and/or alkynyl groups. Representative examples include, but are not limited to, norbornyl, norbomenyl, ethylnorbornyl, ethylnorbomenyl, cyclohexyl, ethylcyclohexyl, ethylcyclohexenyl, cyclohexylcyclohexyl, and cyclododecatrienyl.

The term "aryl" means any monovalent aromatic hydrocarbon group; the term "aralkyl" means any alkyl group (as defined herein) in which one or more hydrogen atoms have been substituted by the same number of like and/or different aryl (as defined herein) groups; and, the term "arenyl" means any aryl group (as defined herein) in which one or more hydrogen atoms have been substituted by the same number of like and/or different alkyl groups (as defined herein). Examples of aryls include, but are not limited to, phenyl and naphthalenyl. Examples of aralkyls include, but are not limited to, benzyl and phenethyl. Examples of arenyls include, but are not limited to, tolyl and xylyl. As used herein, the term "aromatic hydrocarbon" encompasses aryl, aralkyl, and arenyl groups.

Provided is a thermally conductive silicone composition comprising (A) an ionically modified siloxane, and (B) a thermally conductive filler. In embodiments, the composition comprises a combination of two or more thermally conductive fillers. The combination of the ionically modified siloxane and the thermally conductive filler provides a composition that exhibits suitable thermal conductivity and other desirable properties in terms of hardness, elongation, etc.

The ionically functionalized siloxane (A) is represented by a compound of the formula:

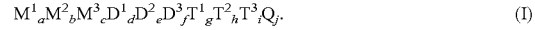

$$M^1{}_aM^2{}_bM^3{}_cD^1{}_dD^2{}_eD^3{}_fT^1{}_gT^2{}_hT^3{}_iQ_j. \quad (I)$$

wherein:

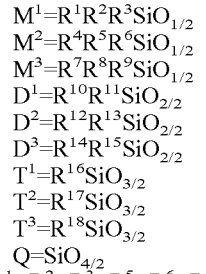

$M^1=R^1R^2R^3SiO_{1/2}$
$M^2=R^4R^5R^6SiO_{1/2}$
$M^3=R^7R^8R^9SiO_{1/2}$
$D^1=R^{10}R^{11}SiO_{2/2}$
$D^2=R^{12}R^{13}SiO_{2/2}$
$D^3=R^{14}R^{15}SiO_{2/2}$
$T^1=R^{16}SiO_{3/2}$
$T^2=R^{17}SiO_{3/2}$
$T^3=R^{18}SiO_{3/2}$
$Q=SiO_{4/2}$ $R^1$, $R^2$, $R^3$, $R^5$, $R^6$, $R^8$, $R^9$, $R^{10}$, $R^{11}$, $R^{13}$, $R^{15}$, $R^{16}$ are independently chosen from a substituted or unsubstituted aliphatic, alicyclic, or aromatic containing hydrocarbon having from 1 to 60 carbon atoms, optionally containing heteroatom(s);

$R^4$, $R^{12}$, and $R^{17}$ are independently chosen from (i) a monovalent radical-bearing ion-pairs having the formula (II), or (ii) a zwitterion having formula (III), wherein formula (II) is as follows:

$$A\text{-}I^{x-}M_m{}^{y+} \quad (II)$$

where A is a spacing group having at least one spacing atom selected from a divalent hydrocarbon or hydrocarbonoxy group; I is an ionic group selected from sulfonate (—SO$_3{}^-$), sulfate (—OSO$_3{}^-$), carboxylate (—COO$^-$), phosphonate (—PO$_3{}^{2-}$), and phosphate (—OPO$_3{}^{2-}$) groups; M is chosen from hydrogen or a cation independently selected from alkali metals, alkaline earth metals, transition metals, rare earth metals, metals, metal complexes, quaternary ammonium, and phosphonium groups, hydrocarbon cations, alkyl cations, organic cations, and cationic polymers; formula (III) is as follows:

$$\text{—}R'\text{—}NT_a{}^+R''\text{—}I \quad (III)$$

where R' is a divalent hydrocarbon radical containing from 1 to about 60 carbon atoms, R'' is a divalent hydrocarbon radical containing from 2 to about 60 carbon atoms, specifically from 2 to about 8 carbon atoms and more specifically from 2 to about 4 carbon atoms; and, I is an ionic group selected from sulfonate —SO$_3{}^-$, sulfate —OSO$_3{}^-$, carboxylate —COO$^-$, phosphonate —PO$_3{}^{2-}$ and phosphate —OPO$_3{}^{2-}$ groups; T is independently selected from hydrogen, an aliphatic group having 1 to 60 carbon atoms, an alicyclic group having 6 to 60 carbon atoms, or an aromatic group having 6 to 60 carbon atoms; a is 1 or 2;

$R^7$, $R^{14}$, and $R^{18}$ are independently selected from hydrogen, OR$^{20}$, or an unsaturated monovalent hydrocarbon optionally containing heteroatom(s) or a heteroatom such as oxygen, nitrogen, sulfur or containing organosilane groups; and the subscript a, b, c, d, e, f, g, h, i, j are zero or positive subject to the following limitations: 2≤a+b+c+d+e+f+g+h+i+j≤1000, b+e+h>0 and c+f+i≥0.

$R^1$, $R^2$, $R^3$, $R^5$, $R^6$, $R^8$, $R^9$, $R^{10}$, $R^{11}$, $R^{13}$, $R^{15}$, $R^{16}$ are substituted or unsubstituted aliphatic, alicyclic or aromatic hydrocarbon having from 1 to 60 carbon atoms, optionally containing heteroatom(s). In one embodiment, $R^1$, $R^2$, R, $R^6$, $R^8$, $R^9$, $R^{10}$, $R^{11}$, $R^{13}$, $R^{15}$, $R^{16}$ is chosen from a substituted or unsubstituted aliphatic hydrocarbon of 1 to 60 carbon atoms; 5 to 50 carbon atoms; 10 to 40 carbon atoms; or 20 to 30 carbon atoms. In one embodiment, $R^1$, $R^2$, $R^3$, $R^5$, $R^6$, $R^8$, $R^9$, $R^{10}$, $R^{11}$, $R^{13}$, $R^{15}$, $R^{16}$, and T are selected from an aliphatic hydrocarbon of 1 to 10 carbon atoms; 2-8 carbon atoms; or 4-6 carbon atoms. In embodiments, $R^1$, $R^2$, $R^3$, $R^5$, $R^6$, $R^8$, $R^9$, $R^{10}$, $R^{11}$, $R^{13}$, $R^{15}$, $R^{16}$, and T may be chosen from an alicyclic or aromatic hydrocarbon having 6 to 60 carbon atoms; 8 to 40 carbon atoms; or 10 to 20 carbon atoms. Examples of useful aliphatic hydrocarbon groups include, but are not limited to, methyl, ethyl, n-propyl, iso-propyl, n-butyl, isobutyl, tert-butyl, n-pentyl, iso-pentyl, neopentyl, and tert-pentyl; hexyl, such as the n-hexyl group; heptyl, such as the n-heptyl group; octyl, such as the n-octyl and isooctyl groups and the 2,2,4-trimethylpentyl group; nonyl, such as the n-nonyl group; decyl, such as the n-decyl group; cycloalkyl radicals, such as cyclopentyl, cyclohexyl and cycloheptyl radicals and methylcyclohexyl radicals. Examples of aromatic hydrocarbon groups include, but are not limited to, phenyl, naphthyl; o-, m- and p-tolyl, xylyl, ethylphenyl, and benzyl.

In one embodiment, T is hydrogen and a in formula (III) is 2. In one embodiment, T is an aliphatic group, an acyclic group, or an aromatic group. Examples of useful aliphatic hydrocarbon groups include, but are not limited to, methyl, ethyl, n-propyl, iso-propyl, n-butyl, isobutyl, tert-butyl, n-pentyl, iso-pentyl, neopentyl, and tert-pentyl; hexyl, such as the n-hexyl group; heptyl, such as the n-heptyl group; octyl, such as the n-octyl and isooctyl groups and the 2,2,4-trimethylpentyl group; nonyl, such as the n-nonyl group; decyl, such as the n-decyl group; cycloalkyl radicals, such as cyclopentyl, cyclohexyl and cycloheptyl radicals and methylcyclohexyl radicals. Examples of aromatic hydrocarbon groups include, but are not limited to, phenyl, naphthyl; o-, m- and p-tolyl, xylyl, ethylphenyl, and benzyl. In one embodiment, T is an aliphatic group and a is 2.

$R^4$, $R^{12}$, $R^{17}$ are independently chosen from a monovalent radical-bearing ion-pairs having the formula (II), or (ii) Zwitterion, of the formula (III). The monovalent radial-bearing ion-pairs is of the formula (II):

$$A\text{-}I^{x-}M_m^{y+} \qquad (II)$$

where A is a spacing group having at least one spacing atom selected from a divalent hydrocarbon or hydrocarbonoxy group; I is an ionic groups such as sulfonate —SO$_3$—, sulfate —OSO$_3$$^-$, carboxylate —COO$^-$, phosphonate —PO$_3$$^{2-}$, or phosphate —OPO$_3$$^{2-}$ groups, more specifically sulfonate —SO$^{3-}$, where M is hydrogen or a cation independently selected from alkali metals, alkaline earth metals, rare earth metals, transition metals, metals, metal complexes, quaternary ammonium and phosphonium groups, hydrocarbon cations, alkyl cations, organic cations, and cationic polymers. The subscript m and superscript y are independently from 1 to 6 and x is the product of m times y.

The divalent hydrocarbon group A in formula (II) may be chosen from an alkylene group, an arylene group, an aralkylene group, or an hydrocarbonoxy group. In one embodiment, the divalent hydrocarbon group of A in formula (II) is an alkylene group of the formula —(CHR$^{45}$)$_q$— where m has a value of 1 to 20, specifically, from 1 to about 10 and R$^{45}$ is hydrogen or R$^1$. In one embodiment, the divalent hydrocarbon group of A in formula (II) is an arylene group selected from the group consisting of —(CH$_2$)$_l$C$_6$H$_4$(CH$_2$)$_k$—, —CH$_2$CH(CH$_3$)(CH$_2$)$_k$C$_6$H$_4$—, where l has a value of 0 to 20, from 1 to about 10, or from 2 to 8; and k has a value of 0 to 20, from 0 to about 10, or 1 to 5.

M in the ionic moiety of formula (II) can be a cation of a metal independently selected from Li, Na, K, Cs, Mg, Ca, Ba, Zn, Cu, Fe, Ni, Ga, Al, Mn, Cr, Ag, Au, Pt, Pd, Ru, and Rh. One skilled in the art can understand that the cations can exist in multivalent forms, e.g., Mn$^{+2}$ and Mn$^{+3}$.

Alternatively, $R^4$, $R^{12}$, $R^{17}$ can be chosen from a zwitterion of the formula (III):

where R' is a divalent hydrocarbon radical containing from 1 to about 60 carbon atoms, specifically from 1 to about 20 carbon atoms, and more specifically from 1 to about 8 carbon atoms, and R" is a divalent hydrocarbon radical containing from 2 to about 20 carbon atoms, specifically from 2 to about 8 carbon atoms, and more specifically from 2 to about 4 carbon atoms; and, I is an ionic group such as sulfonate —SO$_3$$^-$, sulfate —OSO$_3$$^-$, carboxylate —COO$^-$, phosphonate —PO$_3$$^{2-}$, or phosphate —OPO$_3$$^{2-}$ groups; T is independently selected from hydrogen, an aliphatic group having 1 to 60 carbon atoms, an alicyclic group having 6 to 60 carbon atoms, or an aromatic group having 6 to 60 carbon atoms; a is 1 or 2. In one embodiment, T can be selected from those groups as previously described.

$R^7$, $R^{14}$, and $R^{18}$ may be chosen from a curable functional group. In embodiments, $R^7$, $R^{14}$, and $R^{18}$ in can be selected independently from a group of the formulae (IV) to (VII).

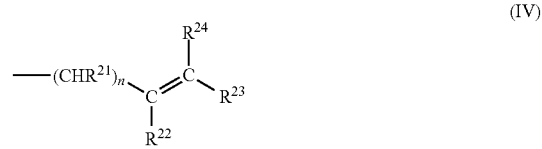

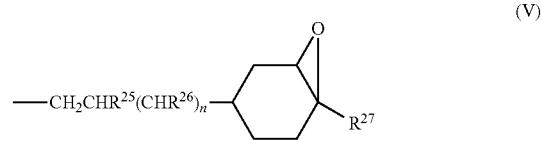

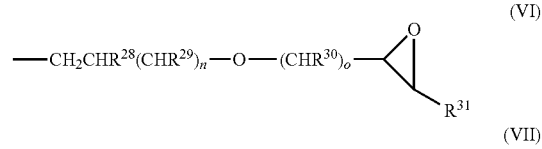

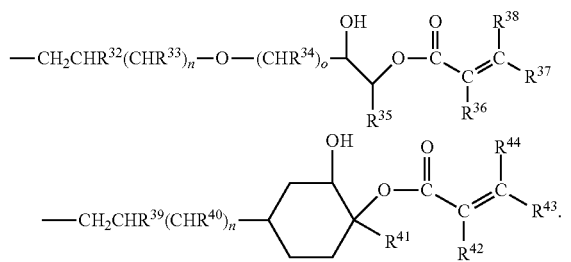

where $R^{21}$, $R^{26}$, $R^{29}$, $R^{30}$, $R^{33}$, $R^{34}$, $R^{40}$ are independently selected from —H, —OH, alkyl, alkenyl, cycloalkyl, aryl, and aliphatic/aromatic monovalent hydrocarbon having from 1 to 60 carbon atoms. The subscript n is zero or positive integer and has a value in the range of 0 to 6, subscript o is positive integer and has a value in the range of 1 to 6; and $R^{20}$, $R^{22}$, $R^{23}$, $R^{24}$, $R^{25}$, $R^{27}$, $R^{28}$, $R^{31}$, $R^{32}$, $R^{35}$, $R^{36}$, $R^{37}$, $R^{38}$, $R^{39}$, $R^{41}$, $R^{42}$, $R^{43}$, $R^{44}$, are independently selected from aliphatic/aromatic monovalent hydrocarbon having from 1 to 60 carbon atoms.

The subscript a, b, c, d, e, f, g, h, i, j are zero or positive integer subject to the following limitations: $2 \le a+b+c+d+e+f+g+h+i+j \le 1000$, $b+e+h>0$ and $c+f+i \ge 0$. In one embodiment, $5 \le a+b+c+d+e+f+g+h+i+j \le 750$; $10 \le a+b+c+d+e+f+g+h+i+j \le 500$; $25 \le a+b+c+d+e+f+g+h+i+j \le 250$; or $50 \le a+b+c+d+e+f+g+h+i+j \le 100$.

The ionically modified polysiloxane (A) has a molecular weight as desired for a particular purpose or intended application. In one embodiment, the ionically modified polysiloxane (A) has a weight-average molecular weight (Mw) of from about 6000 to about 35000 g/mol; from about 6000 to 12000 g/mol about; even from about 7000 to about 9500 g/mol. Here as elsewhere in the specification and claims, numerical values may be combined to form new and non-specified ranges. The weight-average molecular weight may be determined by proton and silicone NMR.

The molecular weight of the ionically modified polysiloxane (A) may be controlled, selected, or adjusted to provide a polysiloxane (A) with a viscosity that will allow the formulation to be workable and/or to prevent loss due to volatilization, which may reduce dry-out during operating cycles. In one embodiment, the ionically modified siloxane (A) has a viscosity of from about 0.01 pas to about 45 pas; from about 0.1 pas to about 10 pas; even from about 0.2 pas to about 5 pas. The viscosity of the ionically modified polysiloxane (A) may be determined by brookfield viscometer.

The ionically modified siloxane may be provided such that it has an ionic ratio of from about 0.2 to about 1; from about 0.2 to about 0.8; or from about 0.3 to about 0.7. As used herein, the "ionic ratio" refers to the number of ionic moieties per 100-120 Si—O groups. Without being bound to any particular theory, controlling the ionic ratio may allow for control and improved dispersion of the modified siloxane within the matrix.

The thermally conductive filler (B) comprises a combination of fillers, where at least one filler material is provided as a plurality of filler types. As used herein, a "filler type" refers to a category of filler material having a particular characteristic. Examples of characteristics defining a filler type include, for example, the morphology of the filler, the particle size of the filler, or the morphology and particle size of the filler. Examples of different embodiments of different filler types include:

a first filler type having a first particle size, and a second filler type having a second particle size, where the first and second filler types have the same morphology a first filler type having a first morphology, and a second filler type having a second morphology, where the first and second filler types have the same particle size;

a first filler type having a first morphology, and a second filler type having a second morphology, where the first and second filler types have different particle sizes.

In the above embodiments, the first and second filler may be a single type of filler or may itself be provided with multiple filler types.

In one embodiment, the first filler and the second filler are each provided by a plurality of filler types of the respective filler materials. The composition may include any combination of a first filler and a second filler, where (i) the first filler is provided by:

a first filler type having a first particle size, and a second filler type having a second particle size, where the first and second filler types have the same morphology;

a first filler type having a first morphology, and a second filler type having a second morphology, where the first and second filler types have the same particle size; or a first filler type having a first morphology, and a second filler type having a second morphology, where the first and second filler types have different particle sizes; and (ii) the second filler is provided by:

a second filler type having a first particle size, and a second filler type having a second particle size, where the first and second filler types have the same morphology;

a second filler type having a first morphology, and a second filler type having a second morphology, where the first and second filler types have the same particle size; or a second filler type having a first morphology, and a second filler type having a second morphology, where the first and second filler types have different particle sizes.

So, for example, in one embodiment, there may be provided (a) a first filler provided by (i) a first filler type having a first particle size, and (ii) a second filler type having a second particle size; and (b) a second filler provided by (i) a first filler type having a first particle size, and (ii) a second filler type having a second particle size. In another embodiment, the composition may comprise (a) a first filler provide by (i) a first filler type having a first particle size, and (ii) a second filler type having a second particle size, where the first and second filler types have the same morphology; and (b) a second filler provided by (i) a first filler type of a first morphlogy, and (ii) a second filler type of a second morphology.

It will be appreciated that while the above description refers to a first filler and a second filler, the composition is not limited to two fillers. The composition may comprise two, three, four, five, etc., or more fillers, where at least one of the fillers is provided by a plurality of filler types of that filler material. Optionally, each of the fillers may be provided by a plurality of filler types of the respective filler materials.

The filler materials for the thermally conductive filler (B) can be chosen from a metal oxide or a non-oxide filler. Examples of suitable non-oxide fillers include a metal boride, a metal carbide, a metal nitride, a metal silicide, carbon black, graphite, expanded graphite, graphene, carbon fiber, or graphite fiber or a combination of two or more thereof. Examples of thermally conductive fillers include, but are not limited to, alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, expanded graphite, metallic powders, e.g., aluminum, copper, bronze, brass, etc., fibers or whiskers of carbon, graphite, silicon carbide, silicon nitride, alumina, aluminum nitride, zinc oxide, nano-scale fibers such as carbon nanotubes, boron nitride nanosheets, zinc oxide nanotubes, etc., and mixtures of two or more thereof. In one embodiment, the thermally conductive filler has a low electrical conductivity or is electrically insulating.

In one embodiment, the composition comprises a first filler chosen from a metal oxide, and the second filler is chosen from a non-oxide filler (e.g., a nitride, a carbide, a silicide, etc.). In one embodiment, the metal oxide filler is provided as a plurality of filler types of different particle sizes, and the non-oxide filler is provided as a single filler type (e.g., a filler of a particular morphology and particle size). In another embodiment, (a) the metal oxide filler comprises a first filler type of a first particle size and a second filler type of a second particle size; and (b) the non-oxide filler comprises (i) a first filler type of a first morphology, and (ii) a second filler type of a second morphology.

The morphology of the respective fillers may chosen as desired. In one embodiment, the morphology of the filler may be chosen from spherical, platelet, agglomerates, spherical agglomerates, and graphitic.

In one embodiment, the first and second thermally conductive filler materials have a particle size of 0.3 to about 350 microns. In one embodiment, the thermally conductive filler has a particle size of about 0.5 to 150 microns; about 1 to about 100 microns, about 10 to 90 microns; about 20 to 75 microns; even about 40 to 60 microns.

The composition may have total filler concentration, i.e., the concentration of all the fillers in the composition, of from about 25 vol. % to about 80 vol. % based on the total volume of the composition. In one embodiment the filler loading is from about 30 vol. % to about 75 vol. % from about 35 vol. % to about 65 vol. %, even from about 40 vol. % to about 60 vol. %. Here as in the claims, numerical values may be combined to form new and unspecified ranges.

The composition may comprise from about 10 vol. % to 90 vol. % of the first filler and 90 vol. % to 10 vol. % of the second filler; from about 30 vol. % to 70 vol. % of the first filler and 70 vol. % to 30 vol. % of the second filler; even from about 40 vol. % to about 60 of the first filler and about 60 vol. % to about 40 vol. % of the second filler.

Regarding the different filler types contributing to the first and/or second fillers, the concentration of the different filler types may be chose as desired. In one embodiment, the first filler comprises a first filler type in an amount of about 5 vol. % to about 95 vol. % and a second filler type in an amount of about 95 vol. % to about 5 vol. % based on the total volume of the first filler; a first filler type in an amount of about 10 vol. % to about 80 vol. % and a second filler type in an amount of about 20 vol. % to about 90 vol. % based on the total volume of the first filler; a first filler type in an amount of about 30 vol. % to about 60 vol. % and a second filler type in an amount of about 70 vol. % to about 40 vol. % based on the total volume of the first filler. In one embodiment, the first filler comprises a first filler type in an amount of about 20 vol. % to about 40 vol. % and a second filler type in an amount of about 80 vol. % to about 60 vol. % based on the total volume of the first filler.

In one embodiment, the thermally conductive filler includes a boron nitride. Examples of suitable boron nitride materials include boron nitride particles, boron nitride agglomerates, or a mixture thereof. Boron nitride particles generally exhibit a platelet form. In one embodiment, the boron nitride particles can be platelets having a particle size of 0.3 to about 350 microns. In one embodiment, the platelet boron nitride particles have a particle size of about 0.5 to 150 microns; about 1 to about 100 microns, about 10 to 90 microns; about 20 to 75 microns; even about 40 to 60 microns. In another embodiment, the thermally conductive plastic composition comprises boron nitride agglomerates. The agglomerates can have a mean particle size of from about 5 to about 500 microns and a surface area of about 0.25 to about 50 $m^2$/gram. In one embodiment, the platelet boron nitride particles have a particle size of about 10 to 400 microns; about 20 to about 300 microns, about 30 to 200 microns; about 40 to 150 microns; even about 50 to 100 microns.

Particle size can be measured using a Horiba LA300 particle size distribution analyzer where the particle to be analyzed (e.g., BN) is introduced in an amount adjusted to meet the required transmission. A few drops of 2% Rhodapex CO-436 can be added to improve the dispersion of the powder, and the particle size can be measured using laser diffraction after a 3 second sonication. The particle size distribution resulting from the measurement can be plotted on a volume basis and the D90 represents the $90^{th}$ percentile of the distribution.

In one embodiment, the filler may be functionalized with a functionalization additive such as, for example, a silane additive. In one embodiment, the silane additive can be chosen from an alkoxy silane, alkacryloxy silane, a vinyl silane, a halo silane (e.g., a chlorosilane), a mercapto silane, a blocked mercaptosilane, a thiocarboxylate silane, or a combination of two or more thereof. In one embodiment, the fillers can comprise from about 1 to about 5 wt. % of a silane; from about 1.5 to about 4 wt. %; even from about 2.7 to about 3.7 wt. % of the fillers.

In one embodiment, the composition comprises a first filler chosen from a metal oxide, and a second filler chosen from a non-oxide filler where the first filler and/or the second filler comprises a plurality of filler types. In one embodiment, the first filler is a metal oxide comprising a first type of metal oxide and a second type of metal oxide, which may be the same or different metal oxide in terms of chemical make up, and the second filler comprises a single type of non-oxide filler, where any of the following (alone or in combination) may be employed:

the first type of metal oxide has a first particle size, and the second type of metal oxide has a second particle size different from the first particle size;

the first and second type of metal oxide independently have a particle size of from about 0.3 to about 350 microns, where the first and second type of metal oxide have a different particle size;

the first type of metal oxide has a first morphology, and the second type of metal oxide has a second morphology different from the first morphology;

the metal oxide filler is chosen from alumina, magnesia, ceria, hafnia, lanthanum oxide, neodymium oxide, samaria, praseodymium oxide, thoria, urania, yttria, zinc oxide, and/or zirconia;

the non-metal oxide filler is chosen from silicon carbide, silica, boron carbide, titanium carbide, zirconium carbide, boron nitride, silicon nitride, aluminum nitride, titanium nitride, zirconium nitride, or zirconium boride;

the first filler is alumina, and the second filler is boron nitride;

the second filler is a boron nitride chosen from spherical, platelet, agglomerates, or spherical agglomerates.

In one embodiment, the composition comprises a first filler chosen from a metal oxide, and a second filler chosen from a non-oxide filler where the first filler and the second filler each comprises a plurality of filler types. In one embodiment, the first filler is a metal oxide comprising a first type of metal oxide and a second type of metal oxide, where the first and second type of metal oxide may have the same or different chemical composition or formula (but differ at least in respect of particle size and/or morphology), and the second filler comprises a single type of non-oxide filler, where any of the following may be employed in combination with one another:
- the first type of metal oxide has a first particle size, and the second type of metal oxide has a second particle size different from the first particle size;
- the first and second type of metal oxide independently have a particle size of from about 0.3 to about 350 microns, where the first and second type of metal oxide have a different particle size;
- the first type of metal oxide has a particle size of about 0.4 micron to about 3 microns; the second type of metal oxide has a particle size of 3 to about 12 microns;
- the first type of metal oxide has a particle size of about 0.1 micron to about 1 microns; the second type of metal oxide has a particle size of 10 to about 15 microns
- the first type of metal oxide has a first morphology, and the second type of metal oxide has a second morphology different from the first morphology;
- the first type of metal oxide has a first particle size, and the second type of metal oxide has a second particle size different from the first particle size;
- the metal oxide filler is chosen from alumina, magnesia, ceria, hafnia, lanthanum oxide, neodymium oxide, samaria, praseodymium oxide, thoria, urania, yttria, zinc oxide, and/or zirconia;
- the non-metal oxide filler is chosen from silicon carbide, silica, boron carbide, titanium carbide, zirconium carbide, boron nitride, silicon nitride, aluminum nitride, titanium nitride, zirconium nitride, or zirconium boride;
- the non-metal oxide filler has a particle size of about 30 to about 500 microns;
- the first filler is alumina, and the second filler is boron nitride;
- the second filler comprises platelet boron nitride and boron nitride agglomerates;
- the second filler comprises platelet boron nitride and spherical boron nitride;
- the second filler comprises platelet boron nitride having a particle size of from about 30 to about 50 microns and boron nitride agglomerates of from about 110 to about 150 microns;
- the second filler comprises platelet boron nitride having a particle size of from about 30 to about 50 microns and boron nitride agglomerates of from about 300 to about 370 microns;
- the second filler comprises platelet boron nitride having a particle size of from about 5 to about 50 microns and spherical boron nitride particles having a particle size of from about 1 to about 10 microns;
- the second filler comprises platelet boron nitride having a particle size of from about 5 to about 50 microns; spherical boron nitride particles having a particle size of from about 1 to about 10 microns; and spherical boron nitride particles having a particle size of from about 50 to about 70 microns.

In one embodiment, the composition comprises a first filler having a first filler type of a particle size of from about 0.3 to about 350 microns, and a second filler type having a particle size of from about 0.3 to about 350 microns, where the second filler type of the first filler has a different particle size from the first filler type. In one embodiment, the composition comprises a first filler with a first filler type having a particle size of from about 0.3 to about 350 microns, and a second filler type having a particle size of from about 0.3 to about 15 microns. In one embodiment, the composition comprises a first filler having a first filler type with a particle size of from about 45 to about 350 microns and a second filler type having a particle size of form about 0.3 to about 5 microns. In one embodiment, the composition comprises a first filler with a first filler type having a particle size of from about 5 to about 70 microns, and a second filler type having particle size of from about 0.5 to about 15 microns. In one embodiment, the first filler comprises alumina.

The composition may further comprise an addition or condensation curing catalyst. The present compositions are curable and may be cured by either condensation curing mechanisms or thermal curing mechanisms. In one embodiment, the compositions are condensation curable. For a condensation curable composition, the composition may include any suitable components to promote condensation curing. The composition may optionally comprise a condensation catalyst which promotes the condensation of completely or partially hydrolyzed topcoat material. The catalyst can be a catalyst suitable for promoting the curing of siloxanes. Advantageously, condensation catalysts can be employed. Suitable condensation catalysts include, but are not limited to, dialkyltin dicarboxylates such as dibutyltin dilaurate and dioctyltin dilaurate, tertiary amines, the stannous salts of carboxylic acids, such as stannous octoate and stannous acetate, etc. Other useful catalysts include zirconium-containing, aluminum-containing, and bismuth-containing complexes such as K-KAT® XC6212, K-KAT® 5218 and K-KAT® 348, supplied by King Industries, Inc., titanium chelates such as the TYZOR® types, available from DuPont company, and the KR types, available from Kenrich Petrochemical, Inc., and other organometallic catalysts, e.g., those containing a metal such as Al, Zn, Co, Ni, Fe, etc.

Generally, the catalyst should be added in an amount that will not affect or impair the physical properties of the composition, but in a sufficient amount to catalyze the curing reaction. In one embodiment, the catalyst is provided in an amount ranging from 1 ppm to about 75 ppm; from about 10 ppm to about 70 ppm; even from about 20 ppm to about 60 ppm. Here, as elsewhere in the specification and claims, numerical values may be combined to form new and non-disclosed ranges. The "ppm" value of the catalyst may be defined as total moles of catalyst per total weight solid of the composition.

When the curable group in formula (I) includes a vinyl of the general formula (IV) or an acrylate or acrylamide or methacrylate of general formula (VII), the composition of the present invention preferable contain a photoinitiator. The photoinitiator may be present in an amount of from about 0.001-10 parts by weight thermal or photoinitiators based on the weight of total formulation. Examples of suitable thermal or photoinitiators include, but are not limited to, carbonyl compounds such as benzoin, benzoin methyl ether, benzoin ethyl ether, benzoin propyl ether, benzoin-n-butyl ether, benzoin isobutyl ether, acetoin, butyroin, toluoin, benzil, benzophenone, para methoxybenzophenone, 2,2-diethoxyacetophenone, alpha-alpha-dimethoxy-alpha-phenylacetophenone, methylphenyl glyoxylate, ethyphenyl glyoxylate, 4,4'-bis-(dimethylaminobenzophenone), propiophenone, acetophenone, 1-hydroxycyclohexyl phenyl ketone, 2,2-diethoxyacetophenone, ethlphenylpyloxylate, phenanthraquinone, and 2-hydroxy-2-methyl-1-phenyl-propan-1-one; sulfur compounds such as tetramethylthiuram monosulfide and tetramethylthiuram disulfide; azo compounds such as azobisisobutyronitrile and azobis-2,4-dimethylvaleronitrile; and organic peroxide compounds such as benzoyl peroxide, dicumyl peroxide, methyl ethyl ketone peroxide; acetone peroxide, and di-tert-butyl peroxide, thioxanthone photoinitiators such as 7-chlorothioxanthone, 2,4-diethylthioxanthone and 2,4-diisopropylthioxanthone; and acylophosphine oxide photoinitiators. In addition to those above, commercially available proprietary free radical initiator compositions such as but not limited to Irgacure (Ciba Speciality Chemicals), VAZO (DuPont), Darcure etc. can also be used to the same effect.

When the curable group in formula (I) includes an epoxide of general formula (V and VI), the composition of the present invention may contain cationic photoinitiators. Such photoinitiators may be present in an amount of 0.1-20 parts by weight based on the weight of the siloxane (A). Examples of suitable cationic photoinitiators include, but are not limited to, diaryliodonium salts, triarylsulfonium salts, triarylselenonium salts, tetraarylphosphonium salts and aryldiazonium salts, represented by the formulas $R^{50}{}_2I^+Y^-$, $R^{50}{}_3S^+Y^{1-}$, $R^{50}{}_3Se^+Y^-$, $R^{50}{}_4P^+Y^-$ and $R^{50}{}_4N^+Y^-$ respectively (wherein, $R^{50}$ represents an aryl group, and $Y^-$ represents an anion such as $SbF_6^-$, $AsF_6^-$, $PF_6^-$, $BF_4^-$, $HSO_4^-$ and $ClO_4^-$).

Optionally, the composition may comprise materials that may be coupled or crosslinked with the curable functional group when the ionically modified siloxane (A) comprises a curable functional group of the formulas (IV)-(VII). Examples of materials that may react with the curable functional groups include, but are not limited to acrylate derivatives, ethylenically unsaturated derivatives, and thiol derivatives.

Acrylate derivatives include the condensation products of acrylic acid, alkyl-substituted acrylic acid and various alcohols, amines or similar nucleophilic substituents, and are specifically selected from the group consisting of any monomeric or oligomeric molecule possessing one or more acrylic, methacrylic, ethacrylic groups that can be co-cured with the composition. Preferably, the acrylate derivatives are selected from the group consisting of methacrylate, butylacrylate, propylacrylate, N,N-dimethylacrylamide, methacrylic acid, N-isopropyl acrylamide, 2-hydroxy-ethyl-methacrylate (HEMA), and methacrylic acid, 3-[tris(trimethylsiloxy)silyl]propyl methacrylate, acrylate and methacrylate functional carbosilane molecules, hexafunctional urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated trimethylolpropane triacrylate, butanediol diacrylate, tripropylene glycol diacrylate, trimethylolpropane trimethacrylate, oligofunctional urethane acrylates, tetraacrylate monomer, polyester acrylate oligomers, and combinations thereof.

Ethylenically unsaturated derivatives possess at least one reactive vinyl group which is not an acrylate group, and which can undergo a free radical initiated coupling with the vinyl and acrylate groups of formula (I) above. Examples of such compounds include, but are not limited to, monomers such as styrene, divinyl benzene, N-vinyl pyrrolidone, N-vinyl lactam, vinyl halides, vinyl acetates, vinyl alcohols, allyl alcohols, allyl polyethers and others that can react with an —$Si^{vi}$ group.

Thiol derivatives include monomers and polymers possessing free thiol (—SH) groups, these can react via a free radical mechanism with the vinyl and acrylate groups exemplified by formula (IV) and (VII) above. Some non-limiting examples include mercapto-alcohols, mercapto-acetic acids, thioesters, and the like.

Other materials that may be crosslinkable with the ionically modified siloxane (A) include (i) a silicone comprising an alkenyl functional group, and/or (ii) a silicone comprising a Si—H group. The silicones may be polyorganosiloxanes. The polyorganosiloxanes comprising an alkenyl functional group have an average of at least one silicone bonded alkenyl group per molecule. In one embodiment, the polyorganosiloxanes comprising an alkenyl functional group have from 1-2 alkenyl groups bonded to silicon atoms per molecule. In one embodiment, the silicone comprising a Si—H group includes at least two Si—H groups per molecule. The polyorganosiloxane can be illustrated by the following formula $$M^4{}_k M^5{}_l M^6{}_m D^4{}_n D^5{}_o D^6{}_p T^4{}_q T^5{}_r T^6{}_s Q_t.$$

wherein:
$M^4 = R^{45}R^{46}R^{47}SiO_{1/2}$
$M^5 = R^{48}R^{49}R^{50}SiO_{1/2}$
$M^6 = R^{51}R^{52}R^{53}SiO_{1/2}$
$D^4 = R^{54}R^{55}SiO_{2/2}$
$D^5 = R^{56}R^{57}SiO_{2/2}$
$D^6 = R^{58}R^{59}SiO_{2/2}$
$T^4 = R^{60}SiO_{3/2}$
$T^5 = R^{61}SiO_{3/2}$
$T^6 = R^{62}SiO_{3/2}$
$Q = SiO_{4/2}$ $R^{45}$, $R^{46}$, $R^{47}$, $R^{49}$, $R^{50}$, $R^{52}$, $R^{53}$, $R^{54}$, $R^{55}$, $R^{57}$, $R^{59}$, $R^{60}$ are independently chosen from a substituted or unsubstituted aliphatic, alicyclic, or aromatic containing hydrocarbon having from 1 to 60 carbon atoms, optionally containing heteroatom(s);

$R^{48}$, $R^{56}$, and $R^{61}$ are independently selected from hydrogen or $OR^{63}$ $R^{51}$, $R^{58}$, and $R^{62}$ are independently selected from unsaturated monovalent hydrocarbon optionally containing heteroatom(s) or a heteroatom such as oxygen, nitrogen, sulfur or containing organosilane groups;

the subscript k, l, m, n, o, p, q, r, s, t are zero or positive subject to the following limitations: $2 \leq k+l+m+n+o+p+q+r+s+t \leq 1000$. When $m+p+s>1$ then $l+o+r=0$, and when $l+o+r>1$, $m+p+s=0$ The composition may further comprise a curing inhibitor or retardant. The polymerization inhibitor is not particularly limited and may be chosen as desired for a particular purpose or intended use. Inhibitors of the platinum group metal catalysts are well known in the organosilicon art. Examples of suitable inhibitors include, but are not limited to, ethylenically unsaturated amides, aromatically unsaturated amides, acetylenic compounds, ethylenically unsaturated isocyanates, olefinic siloxanes, unsaturated hydrocarbon diesters, unsaturated hydrocarbon mono-esters of unsaturated acids, conjugated or isolated ene-ynes, hydroperoxides, ketones, sulfoxides, amine, phosphines, phosphites, nitrites, diaziridines, etc. Particularly suitable inhibitors for the compositions are alkynyl alcohols and maleates. Examples of suitable polymerization inhibitors include, but are not limited to, diallyl maleate, hydroquinone, p-methoxyphenol, t-butylcatechol, phenothiazine, etc.

The amount of inhibitor to be used in the compositions is not critical and can be any amount that will retard the above described platinum catalyzed hydrosilylation reaction at room temperature while not preventing said reaction at moderately elevated temperature, i.e. a temperature that is 25 to 125° C. above room temperature. No specific amount of inhibitor can be suggested to obtain a specified bath life at room temperature since the desired amount of any particular inhibitor to be used will depend upon the concentration and type of the platinum metal containing catalyst, the nature and amounts of components a and b. The inhibitor can be present in an amount of 0 to about 10% by weight of the composition, about 0.001 wt to 2% by weight of the composition, even about 0.12 to about 1 by weight of the composition. Here as elsewhere in the specification and claims, numerical values can be combined to form new and alternative or unspecified ranges. In one embodiment, the compositions can be free of any inhibitor component.

The composition may further comprise an adhesion promoter. Various organofunctional silane and siloxane adhesion promoters to inorganic substrates are useful in the composition. Suitable silanes include, but are not limited to, amino silanes, epoxy silanes, isocyanurate silanes, mercapto silanes, imido silanes, anhydride silanes, carboxylate functionalized siloxanes, etc. Combinations of various types of adhesions promoters may also be used. Such components typically hinder curing via metal catalyzed hydrosilylation. Suitable adhesion promoters include, but are not limited to various aminosilane materials such as Silquest® A-1120 silane, Silquest A-1110 silane, Silquest A-2120 silane, and Silquest A-1170 silane; epoxysilanes, such as Silquest A-187 silane; isocyanurate silanes such as Silquest A-597 silane; and mercaptosilanes such as Silquest A-189 silane, Silquest A-1891 silane, Silquest A-599 silane available from Momentive Performance Materials.

The compositions may have a thermal conductivity of from about 2 W/m·K to about 14 W/m·K; from about 4 W/m·K to about 12 W/m·K; or from about 6 W/m·K to about 10 W/m·K. Thermal conductivity may be measured by TPS 500 hot disk instrument. The thermal conductivity may be controlled or tuned by the selection of the filler, the concentration of the filler, selecting a combination of filler materials, etc. In embodiments, the thermal conductivity can be tuned or controlled by selecting a filler materials of different particle sizes and by employing the fillers of different particle sizes at different concentration levels.

The compositions may exhibit desirable hardness and elongation properties. The hardness of the formulations may range from Shore E 10 to Shore E 90; Shore E 20 to Shore E 80; Shore E 30 to Shore E 70; even Shore E 40 to Shore E 60. The compositions, when cured may have an elongation of from 10% to 60%; from 20% to 50%; even from 30% to 40%. Elongation may be measured using durometer.

The compositions may be provided in a variety of forms as may be desired. In embodiments, the composition may be provided in the form of a grease, a potting, a gap filler, a sealant, an adhesive, or a gel. It will be appreciated by those skilled in the as to what the nature of such forms are and what other ingredients or components may be required to provide the composition in such forms. Where the composition is not curable, the resulting thermal interface composition can be formulated as a gel, grease, adhesive, or phase change material that can hold components together during fabrication and thermal transfer during operation of the device.

The compositions may be used in a variety of applications and articles. In one aspect, provided herein are articles comprising the compositions. The present compositions may be used in an article chosen from, but not limited to, an electronic article, an automotive article, a home appliance article, a smart appliance article, a telecommunication article, a healthcare article, a personal care article, an agricultural article, a molded article, a masonry surface, a textile material, or a home care material. Non limiting examples of articles include, light emitting devices, computer devices, a stacked die, mobile phones, tablets, flip chip package, hybrid memory cube, touch screens, Wi-Fi device, automotive technology hifi systems, a through-silicon via (TSV) device, and audio systems, in joints between heat pipes and water tanks in solar heated heating, in fuel cells and wind turbines, in the manufacture of computer chips, gaming consoles, data transfer devices, in light devices, batteries, in housings, coolers, heat exchanging devices, wires, cables, heating wires, refrigerators, dishwashers, air conditionings, accumulators, transformers, lasers, functional clothing, car seats, medical devices, fire protection, electric motors, planes, and trains, as a filament for 3D printing material, drug delivery systems, transdermal patches, wound healing patches, wound dressing patches, patches for scar reduction, transdermal iontophoresis, scaffold for tissue engineering, anti-microbial devices, wound management devices, ophthalmic devices, bioinserts, prostheses, body implants, paint, structural coating, masonry coating, or marine coating, seed coating, superspreaders, or controlled release fertilizer.

In one embodiment, the article in which the composition is being employed is an article comprising multiple layers. The compositions may be used in any suitable manner (e.g., an adhesive, a filler, etc.) between adjacent layers. The composition may, for example, be disposed on a surface in between at least two of the layers. The composition may cover or fill any percentage of a given surface as is desired for a particular purpose or intended application.

In one embodiment, the compositions may be used as a thermal interface materials. As used herein, a "thermal interface composition" is any material useful in conducting heat away from high temperature areas in an electrical system and can include a thermal interface material ("TIM") placed between a heat sink and a heat generating component of an electrical device or an underfill material utilized in integrated circuit packages, i.e., chips, to fill gaps between the chip and substrate and improve fatigue life of solder used in the chips by removing heat generated during thermal cycling.

The compositions may be dispensed or applied to a surface using any suitable method as is known in the art. Such methods include, but are not limited to, dispensing under pressure, printing, brushing, coating, etc. Examples of printing include, but are not limited to, stencil printing, screen printing, jet printing, 3D printing, etc.

The thickness of the composition as applied in the intended application may be selected as desired for a particular use or intended application. It will be appreciated that the thickness may be from 0.01 mm to 15 cm.

Aspects of the present technology may be further understood with respect to the following examples.

SYNTHESIS EXAMPLES

Example 1. Sulfonic Acid Functionalized Octamethyltetracyclosiloxane

A three necked flask was charged with 1,3,5,7 tetramethylcyclotetrasiloxane ($D_4^H$), alpha-methylstyrene, and platinum catalyst. The resulting mixture was heated at 115° C. while stirring under nitrogen atmosphere. The progress of the reaction mixture was monitored by $^1$H NMR. After completion of the reaction, the reaction mixture was vacuum stripped at 150° C. for 2 hours to remove unreacted alpha-methyl styrene to obtain aryl substituted cyclotetrasiloxane.

To the above aryl substituted cyclotetrasiloxane, chlorosulfonic acid dissolved dichloromethane was added drop wise through a period of 30 minutes while the mixture is stirred at room temperature. The molar ratio of aryl substituted cyclotetrasiloxane and chlorosulfonic acid was fixed to 1:8. The resulting mixture stirred for an additional 30 minutes. The completion of the reaction was determined by $^1$H NMR where complete sulfonation of the aromatic ring was indicated by the disappearance of para-substituted aromatic proton peak. The vacuum stripping of the reaction mixture at low pressure afforded 20.6 g of the sulfonic acid functional cyclotetrasiloxane as a brown viscous gum.

Example 2. Sulfonate Functional Polyorganosiloxane Bearing Terminal Vinyl Groups (Mw~7500-9500 g/Mol and Viscosity Around <1 Pas)

To the 5 gm of sulfonic acid functional cyclotetrasiloxane obtained in Example 1, 250 gm of octamethyltetracyclosiloxane (D4) and 5.2 gm of tetramethyldivinyldisiloxane ($M^{Vi}M^{Vi}$) were added, and to this reaction mixture 1.5 wt % of concentrated sulfuric acid was added, and the reaction mixture was stirred at room temperature. After reaching an equilibrium of ~87%, the reaction mixture was neutralized using moistened sodium bicarbonate at 70° C. The vacuum stripping of the reaction mixture at low pressure afforded sulfonated silicone with the terminal vinyl groups as flowable liquid.

Example 3. Terminal Sulfonate Functional Polyorganosiloxanes (Mw~30,000 g/Mol)

A three necked 500 mL flask was charged with 1,1,3,3 tetramethyldisiloxane ($M^HM^H$), alpha-methylstyrene, and platinum catalyst. The resulting mixture was heated at 115° C. for 48 hours while stirring under nitrogen atmosphere. The complete hydrosilylation was indicated by the disappearance of silicone hydride peak in the $^1$H NMR. The resulting mixture was vacuum stripped to remove unreacted alphamethylstyrene by placing on a oil bath at 150° C. for 2 hours, which gave aryl substituted disiloxane.

To this aryl substituted disiloxane, chlorosulfonic acid was added drop wise through a period of 30 minutes while the mixture was stirred at room temperature. The molar ratio of aryl substituted disiloxane and chlorosulfonic acid was fixed to 1:4. The resulting mixture was stirred for an additional 30 minutes. The completion of the reaction was determined by $^1$H NMR where total sulfonation of the aromatic ring was indicated by the disappearance of para-substituted aromatic proton peak. The vacuum stripping of the reaction mixture at low pressure afforded 33.0 g of the sulfonic acid functionalized disiloxane as a brown viscous oil.

To the 8.3 gm of sulfonic acid functionalized disiloxane, 468 gm of octamethyltetracyclosiloxane ($D_4$) was added and the mixture was stirred at room temperature. After reaching an equilibrium of ~87%, the reaction mixture was neutralized using moistened sodium bicarbonate at 70° C. The vacuum stripping of the reaction mixture at low pressure afforded terminal sulfonated functionalized polyorganosiloxane high viscous gum.

Example 4. Mono Sulfonate Functional Polyorganosiloxanes (Mw~12,000 g/Mol, Viscosity<1 Pas)

To 52 gm sulfonate functionalized polyorganosiloxane of Example 3, 250 gm octamethyltetracyclosiloxane (D4), 3.65 gm hexamethyldisiloxane (MM) and 1.5 wt % of concentrated sulfuric acid with respect to total weight of mixture was added and the reaction mixture was stirred at room temperature. After reaching an equilibrium of ~87%, the reaction mixture was neutralized using moistened sodium bicarbonate at 70° C. The vacuum stripping of the reaction mixture at low pressure afforded mono sulfonated silicone flowable liquid.

Example 5. Sulfonate Functional Polyorganosiloxane Bearing Terminal Vinyl Groups (Mw~30,000 g/Mol and Viscosity Around 5-10 Pas)

To 5 gm of sulfonic acid functional cyclotetrasiloxane obtained in example 1, 414 gm octamethyltetracyclosiloxane (D4) and 2.6 gm tetramethyldivinyldisiloxane ($M^{vi}M^{vi}$) were added, and to this reaction mixture 1.5 wt % of concentrated sulfuric acid was added and the reaction mixture was stirred at room temperature. After reaching an equilibrium of ~87%, the reaction mixture was neutralized using moistened sodium bicarbonate and hexane as diluant at 70° C. The vacuum stripping of the reaction mixture at low pressure afforded sulfonated silicone with the terminal vinyl groups as flowable liquid Composition:

Alumina oxide fillers of size varying from 0.3-12 micron were purchased from Sumitomo. Boron nitride (BN) fillers of size ranging from 5 to 350µ and morphology were procured from Momentive Performance Materials.

The non-curable, grease type thermally conductive compositions were formulated by mixing ionically modified wetter molecule and filler in thinky-planetary mixer at 2000 rpm for 30 seconds. The bleed out studies was done by placing the formulation at 70° C. for 24 hours to validate any settling of fillers. The thixotropic behaviors were studied by measuring viscosity at variable rpm using a Brookfield viscometer. Thermal conductivity (T/C, W/mK) data were determined using TP 500 S hot disk instrument Thermally conductive curable compositions were formulated by mixing vinyl resin, ionically modified wetter, hydride cross linker, chain extender, platinum catalyst, and catalyst inhibitors in thinky-planetary mixer at 2000 rpm for 30 seconds. The compositions identified in Table 1 employed the ionically modified wetter of Example 2. To this mixture, variable fillers with different size and morphology were added step-wise and blended using thinky-planetary mixer at 2000 rpm for 30 seconds at each step. The bleed out studies was done by placing the formulation at 70° C. for 24 hrs to validate any settling of fillers. The compositions were degassed and then cured at 150° C. to yield elastomeric sheets. The curing was done on compression molding at pressure of 14 psi. The elongations were measured on Instron using DIN 53504 2S method. The T/C or thermal conductivity data were determined using TP 500 S hot disk instrument.

TABLE 1

Filler loading vs thermal conductivity for non curable greaseSample

| | Wetter Vol. % (Ex. 2) | Total Filler Vol. % | Alumina* (0.4 to 3 μm) | Alumina* (3 to 12 μm) | BN** (30 to 50 μm) | BN# (110 to 150 μm) | BN# (300 to 370 μm) | Viscosity (7* 4 rpm) | T/C (W/mK) |
|---|---|---|---|---|---|---|---|---|---|
| A1 | 50 | 50 | 17 | 34 | 49 | — | — | 115 | 2.2 |
| A2 | 36 | 64 | 17 | 34 | 49 | — | — | 1100 | 4.7 |
| A3 | 30 | 70 | 17 | 34 | 49 | — | — | >1300 | 5.8 |
| B1 | 36 | 64 | 17 | 34 | — | 60 | — | 900 | 5.5 |
| C1 | 45 | 55 | 20 | 20 | — | 60 | — | 388 | 3.5 |
| C2 | 43 | 57 | 20 | 20 | — | 60 | — | 656 | 3.95 |
| C3 | 40 | 60 | 20 | 20 | — | 60 | — | >2000 | 5.3 |
| C4 | 36 | 64 | 20 | 20 | — | 60 | — | >2000 | 6.6 |
| C5 | 35 | 65 | 20 | 20 | — | 60 | — | >2000 | 8.07 |
| C6 | 33 | 67 | 20 | 20 | — | 60 | — | >2000 | 9.25 |
| D1 | 35 | 65 | 12 | 24 | 21 | — | 43 | >2000 | 6.5 |
| D2 | 33 | 67 | 12 | 24 | 21 | — | 43 | >2000 | 8.4 |
| D3 | 31 | 69 | 12 | 24 | 21 | — | 43 | >2000 | 10.9 |
| D4 | 29 | 71 | 12 | 24 | 21 | — | 43 | >2000 | 11.3 |
| E1 | 31 | 69 | 33.3 | 66.6 | — | — | — | >2000 | 0.98 |
| E2 | 31 | 69 | — | — | — | — | 100 | >2000 | 6.87 |
| E3 | 31 | 69 | 12 | 24 | — | 64 | — | >2000 | 11.97 |

*Spherical morphology
**Platelet morphology
Agglomerate morphology

TABLE 2

Improvement in elongation in thermally curable formulation: Relative Distribution

| | Filler Vol % | Resin vol % | Wetter (Ex. 5) | Alkoxy wetter (Control) | Alumina* (10-15 μm) | Alumina* (0.1-1 μm) | Boron nitride** (5-50 μm) | Boron nitride* (1-10 μm) | Boron nitride* (50-70 μm) | T/C w/mK | Elongation % |
|---|---|---|---|---|---|---|---|---|---|---|---|
| H | 30 | 35 | 35 | — | — | — | 70 | 12 | 18 | 1.39 | 50 |
| I | 30 | 35 | — | 35 | — | — | 70 | 12 | 18 | 1.31 | 18 |
| J | 62 | 19 | 19 | — | 73.8 | 18.46 | 7.54 | — | — | 2.73 | 28 |
| K | 62 | 19 | — | 19 | 73.8 | 18.46 | 7.54 | — | — | 2.47 | 17 |

*Spherical morphology
**Platelet morphology
Agglomerate morphology

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

*Plurality of alumina of particle size ranging from 0.5 to 12μ and Plurality of boron nitride of particle size ranging 5 to 65μ.

The foregoing description identifies various, non-limiting embodiments of a composition comprising an ionically modified siloxane. Modifications may occur to those skilled in the art and to those who may make and use the invention. The disclosed embodiments are merely for illustrative purposes and not intended to limit the scope of the invention or the subject matter set forth in the claims.

What is claimed is:

1. A composition comprising:
(A) an ionically functionalized siloxane (I) represented by a compound of the formula:

$$M^1_a M^2_b M^3_c D^1_d D^2_e D^3_f T^1_g T^2_h T^3_i Q_j \qquad (I)$$

wherein:
$M^1 = R^1 R^2 R^3 SiO_{1/2}$
$M^2 = R^4 R^5 R^6 SiO_{1/2}$
$M^3 = R^7 R^8 R^9 SiO_{1/2}$
$D^1 = R^{10} R^{11} SiO_{2/2}$
$D^2 = R^{12} R^{13} SiO_{2/2}$
$D^3 = R^{14} R^{15} SiO_{2/2}$
$T^1 = R^{16} SiO_{3/2}$
$T^2 = R^{17} SiO_{3/2}$
$T^3 = R^{18} SiO_{3/2}$
$Q = SiO_{4/2}$ $R^1$, $R^2$, $R^3$, $R^5$, $R^6$, $R^8$, $R^9$, $R^{10}$, $R^{11}$, $R^{13}$, $R^{15}$, $R^{16}$ are substituted or unsubstituted aliphatic, alicyclic, or aromatic containing hydrocarbon having from 1 to 60 carbon atoms, optionally containing heteroatom(s);

$R^4$, $R^{12}$, and $R^{17}$ are independently chosen from (i) a monovalent radical-bearing ion-pairs having the formula (II), or (ii) a zwitterion having formula (III), wherein formula (II) is as follows:

$$A\text{-}I^{x-}M_m^{y+} \qquad (II)$$

where A is a spacing group having at least one spacing atom selected from a divalent hydrocarbon or hydrocarbonoxy group; I is an ionic group selected from sulfonate (—SO$_3^-$), sulfate (—OSO$_3^-$), carboxylate (—COO$^-$), phosphonate (—PO$_3^{2-}$), and phosphate (—OPO$_3^{2-}$) groups; M is chosen from hydrogen or a cation independently selected from alkali metals, alkaline earth metals, transition metals, rare earth metals, metals, metal complexes, quaternary ammonium, and phosphonium groups, hydrocarbon cations, alkyl cations, organic cations, and cationic polymers; formula (III) is as follows:

where R' is a divalent hydrocarbon radical containing from 1 to about 60 carbon atoms, R" is a divalent hydrocarbon radical containing from 2 to about 60 carbon atoms, specifically from 2 to about 8 carbon atoms and more specifically from 2 to about 4 carbon atoms; and, I is an ionic group selected from sulfonate —SO$_3^-$, sulfate —OSO$_3^-$, carboxylate —COO$^-$, phosphonate —PO$_3^{2-}$ and phosphate —OPO$_3^{2-}$ groups; T is independently selected from hydrogen, an aliphatic group having 1 to 60 carbon atoms, an alicyclic group having 6 to 60 carbon atoms, or an aromatic group having 6 to 60 carbon atoms; a is 1 or 2;

n and y are independently from 1 to 6 and x is a product of n and y

R$^7$, R$^{14}$, and R$^{18}$ are independently selected from hydrogen, OR$^{20}$, or an unsaturated monovalent hydrocarbon optionally containing heteroatom(s) or a heteroatom such as oxygen, nitrogen, sulfur or containing organosilane groups; where R$^{20}$ is selected from hydrogen, substituted or unsubstituted aliphatic, alicyclic, or aromatic containing hydrocarbon having from 1 to 60 carbon atoms and the subscript a, b, c, d, e, f, g, h, i, j are zero or positive subject to the following limitations: 2≤a+b+c+d+e+f+g+h+i+j≤1000, b+e+h>0 and c+f+i≥0; and (B) (i) a first filler, and (ii) a second filler, where at least one of the first filler and/or the second filler comprises a plurality of filler types differing from one another in terms of particle size and/or morphology.

2. The composition of claim 1, wherein the first and second filler are independently chosen from a metal oxide filler and a non-oxide filler.

3. The composition of claim 2, wherein the non-oxide filler is chosen from a metal boride, a metal carbide, a metal nitride, a metal silicide, carbon black, graphite, graphene, expanded graphite, carbon fiber, or graphite fiber or a combination of two or more thereof.

4. The composition of claim 1, wherein the first and second fillers are independently chosen from alumina, magnesia, ceria, hafnia, lanthanum oxide, neodymium oxide, samaria, praseodymium oxide, thoria, urania, yttria, zinc oxide, zirconia, silicon aluminum oxynitride, borosilicate glasses, barium titanate, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, barytes, barium sulfate, asbestos, barite, diatomite, feldspar, gypsum, hormite, kaolin, mica, nepheline syenite, perlite, phyrophyllite, smectite, talc, vermiculite, zeolite, calcite, calcium carbonate, wollastonite, calcium metasilicate, clay, aluminum silicate, talc, magnesium aluminum silicate, hydrated alumina, hydrated aluminum oxide, silica, silicon dioxide, titanium dioxide, glass fibers, glass flake, clays, exfoliated clays, or other high aspect ratio fibers, rods, or flakes, calcium carbonate, zinc oxide, magnesia, titania, calcium carbonate, talc, mica, wollastonite, alumina, aluminum nitride, graphite, graphene, aluminum powder, copper powder, bronze powder, brass powder, fibers or whiskers of carbon, graphite, silicon carbide, silicon nitride, alumina, aluminum nitride, zinc oxide, carbon nanotubes, boron nitride nanosheets, zinc oxide nanotubes, or a combination of two or more thereof.

5. The composition of claim 1, wherein the plurality of filler types independently have an average particle size of from about 0.3 micron to about 350 micron, the plurality of filler types having average particle sizes different from one another.

6. The composition of claim 1 wherein the plurality of filler types have a morphology different from one another, the morphology being chosen from spherical, platelet, agglomerates, spherical agglomerates and graphitic.

7. The composition of claim 1, wherein the first filler is chosen from aluminum oxide, and the second filler is chosen from boron nitride.

8. The composition of claim 7, wherein the aluminum oxide comprises a plurality of filler types.

9. The composition of claim 8, wherein the plurality of filler types have an average particle size different from one another.

10. The composition of claim 8, wherein the plurality of filler types have a morphology different from one another.

11. The composition of claim 7, wherein the aluminum oxide and the boron nitride each comprise the plurality of filler type.

12. The composition of claim 1, wherein the first filler is chosen from a metal oxide, and the second filler is chosen from a non-oxide filler.

13. The composition of claim 12, where the plurality of filler types of the first filler have an average particle size different from one another, and the plurality of filler types of the second filler have an average particle size different from one another.

14. The composition of claim 12, where the plurality of filler types of the first filler have an average particle size different from one another, and the plurality of filler types of the second filler have a morphology different from one another.

15. The composition of claim 14, wherein the plurality of filler types of the second filler is chosen from platelet boron nitride and agglomerates of boron nitride.

16. The composition of claim 1 comprising about 10 vol. % to about 90 vol. % of the first filler and about 90 vol. % to about 10 vol. % of the second filler.

17. The composition of claim 1 wherein the fillers are treated with a surface functionalizing agent chosen from an alkoxy silane, an alkacryloxy silane, a vinyl silane, a halo silane (e.g., a chlorosilane), a mercapto silane, a blocked mercaptosilane, a thiocarboxylate silane, titanate salts, zirconate salts or a combination of two or more thereof.

18. The composition of claim 1, wherein the divalent hydrocarbon group A is chosen from an alkylene group, an arylene group, an aralkylene group, alicyclic group or an hydrocarbonoxy group.

19. The composition of claim 18, wherein the divalent hydrocarbon group of A in formula (II) is chosen from (i) an alkylene group of the formula —(CHR$^{45}$)$_q$— where q has a value of 2 to 20, and R$^{45}$ is hydrogen or a divalent hydrocarbon of 1 to 20 carbon atoms; (ii) an arylene group selected from the group consisting of —(CH$_2$)$_1$C$_6$H$_4$ $-(CH_2)_k-$, $-CH_2CH(CH_3)(CH_2)_kC_6H_4-$, $-(CH_2)_k C_5H_4-$ where l has a value of 1 to 20, and k has a value of 0 to 10.

20. The composition of claim 1, wherein M is a cation independently selected from Li, Na, K, Cs, Mg, Ca, Ba, Zn, Cu, Fe, Ni, Ga, Al, Mn, Cr, Ag, Au, Pt, Pd, Ru, and Rh.

21. The composition of claim 1, wherein $R^7$, $R^{14}$, and $R^{18}$ are independently selected from a group of the formulae (IV) to (VII)

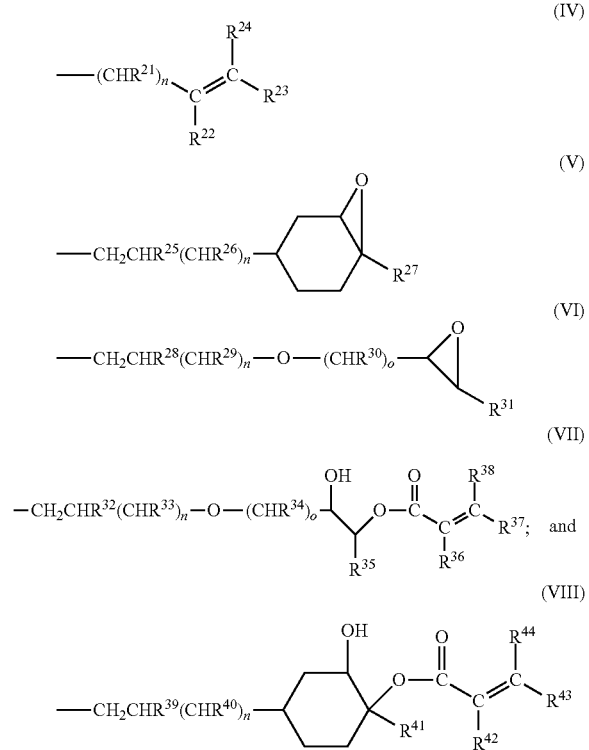

where $R^{21}$, $R^{26}$, $R^{29}$, $R^{30}$, $R^{33}$, $R^{34}$, $R^{40}$ are independently selected from —H, —OH, alkyl, alkenyl, cycloalkyl, aryl, and aliphatic/aromatic monovalent hydrocarbon having from 1 to 60 carbon atoms; the subscript n is zero or positive integer and has a value in the range of 0 to 6, the subscript o is positive integer and has a value in the range of 1 to 6; and $R^{20}$, $R^{22}$, $R^{23}$, $R^{24}$, $R^{25}$, $R^{27}$, $R^{28}$, $R^{31}$, $R^{32}$, $R^{35}$, $R^{36}$, $R^{37}$, $R^{38}$, $R^{39}$, $R^{41}$, $R^{42}$, $R^{43}$, $R^{44}$, are independently selected from aliphatic/aromatic monovalent hydrocarbon having from 1 to 60 carbon atoms.

22. The composition of claim 1, wherein the ionically modified siloxane (A) has a weight-average molecular weight (Mw) of from about 6000 to about 35000 g/mol.

23. The composition of claim 1, wherein the ionically modified siloxane (A) has a viscosity of from about 0.01 Pa·s to about 45 Pa·s.

24. The composition of claim 1, wherein the ionically modified siloxane (A) has 0.2 to 1 ionic character per 100 siloxane (Si—O) unit.

25. The composition of claim 1 further comprising (i) an organopolysiloxane comprising at least one alkenyl functional group; and/or (ii) an organopolysiloxane comprising at least one Si—H group.

26. The composition of claim 1 comprising an addition catalyst, a condensation curing catalyst, an inhibitor, an adhesion promoter, a diluent, a thermal stabilizer, or a combination of two or more thereof.

27. The composition of claim 1 wherein the thermal conductivity of the formulation is between 2 W/mk to 14 w/mk.

28. The composition of claim 1, wherein the composition has a Shore E hardness of from about 10 to about 90.

29. The composition of claim 1 having an elongation of from about 10% to about 60%.

30. The composition of claim 1 in the form of a grease, a potting, a gap filler, a sealant, an adhesive, or a gel.

31. An article comprising the composition of claim 1 disposed on at least a portion of a surface of the article.

32. The article of claim 31, wherein the article comprises multiple layers, and the composition is disposed on a surface in between at least two of the layers.

33. The article of claim 31, wherein the article is an electronic article, an automotive article, a home appliance article, smart appliance article, a telecommunication article, a healthcare article, a personal care article, an agricultural article, a molded article, a masonry surface, a textile material, a home care material.

34. The article of claim 31, wherein the article comprises light emitting devices, computer devices, a stacked die, mobile phones, tablets, flip chip package, hybrid memory cube, touch screens, Wi-Fi device, automotive technology hifi systems, a through-silicon via device, and audio systems, in joints between heat pipes and water tanks in solar heated heating, in fuel cells and wind turbines, in the manufacture of computer chips, gaming consoles, data transfer devices, in light devices, batteries, in housings, coolers, heat exchanging devices, wires, cables, heating wires, refrigerators, dishwashers, air conditionings, accumulators, transformers, lasers, functional clothing, car seats, medical devices, fire protection, electric motors, planes, and trains, as a filament for 3D printing material, drug delivery systems, transdermal patches, wound healing patches, wound dressing patches, patches for scar reduction, transdermal iontophoresis, scaffold for tissue engineering, anti-microbial devices, wound management devices, ophthalmic devices, bioinserts, prostheses, body implants, paint, structural coating, masonry coating, or marine coating, seed coating, superspreader or controlled release fertilizer.

35. A method of preparing the article of claim 31 comprising dispensing the composition under pressure or stencil printing or screen printing or jet printing or 3D printing.

36. The method of claim 35 wherein the thickness of the said composition is from 0.01 mm to 15 cm.

* * * * *